(12) United States Patent
Kravitz

(10) Patent No.: US 8,953,663 B2
(45) Date of Patent: Feb. 10, 2015

(54) CALIBRATION OF QUADRATURE IMBALANCE VIA LOOPBACK PHASE SHIFTS

(75) Inventor: Lior Kravitz, Kfar Bilu (IL)

(73) Assignee: Intel Corporation, Santa Clara, CA (US)

( * ) Notice: Subject to any disclaimer, the term of this patent is extended or adjusted under 35 U.S.C. 154(b) by 864 days.

(21) Appl. No.: 12/586,726

(22) Filed: Sep. 25, 2009

(65) Prior Publication Data
US 2011/0075715 A1 Mar. 31, 2011

(51) Int. Cl.
*H04B 1/38* (2006.01)
*H04L 25/49* (2006.01)
*H04B 1/30* (2006.01)
*H04L 27/38* (2006.01)

(52) U.S. Cl.
CPC .............. *H04B 1/30* (2013.01); *H04L 27/3863* (2013.01)
USPC ............................ 375/221; 375/296; 375/302

(58) Field of Classification Search
USPC ......... 375/211, 219, 220, 221, 285, 279, 280, 375/283, 271, 278, 295, 302, 304, 306, 316
See application file for complete search history.

(56) References Cited

U.S. PATENT DOCUMENTS

| | | |
|---|---|---|
| 5,321,726 A | 6/1994 | Kafadar |
| 6,222,878 B1 | 4/2001 | McCallister et al. |
| 6,229,992 B1 * | 5/2001 | McGeehan et al. ............. 455/78 |
| 6,662,367 B2 | 12/2003 | Dapper et al. |
| 6,940,916 B1 * | 9/2005 | Warner et al. ................. 375/261 |
| 7,010,059 B2 | 3/2006 | Song et al. |
| 7,020,220 B2 | 3/2006 | Hansen |
| 7,088,765 B1 | 8/2006 | Green et al. |
| 7,181,205 B1 | 2/2007 | Scott et al. |

(Continued)

FOREIGN PATENT DOCUMENTS

| | | |
|---|---|---|
| CN | 1201299 A | 12/1998 |
| CN | 1483268 A | 3/2004 |

(Continued)

OTHER PUBLICATIONS

Cavers, James K., The Effect of Quadrature Modulator and Demodulator Errors on Adaptive Digital Predistorters for Amplifier Linearization, IEEE Transactions on Vehicular TEchnology, vol. 46, No. 2, May 1997, pp. 456-466.*

(Continued)

*Primary Examiner* — Sam K Ahn
*Assistant Examiner* — Linda Wong
(74) *Attorney, Agent, or Firm* — Schubert Law Group PLLC

(57) ABSTRACT

Apparatuses, systems, and methods for calibration of quadrature imbalance in direct conversion transceivers are contemplated. A transceiver controller may perform a self-calibration to address quadrature imbalance. The controller may isolate the transmitter and receiver from any antennas, couple the radio frequency (RF) section of the transmitter to the RF section of the receiver via a loopback path, and inject a calibration signal into the transmitter. In the loopback path, the controller may phase-shift the signal that propagates through the transmitter using two different phase angles to produce two different signals that propagate into the receiver. By measuring the two different signals that exit the receiver, the controller may be able to calculate correction coefficients, or parameters, which may be used to adjust elements that address or correct the quadrature imbalance for both the transmitter and receiver.

20 Claims, 5 Drawing Sheets

(56) References Cited

U.S. PATENT DOCUMENTS

| | | | |
|---|---|---|---|
| 7,187,725 B2 | 3/2007 | Song et al. | |
| 7,203,466 B2 | 4/2007 | Muschallik et al. | |
| 7,248,654 B2 | 7/2007 | Song et al. | |
| 7,567,611 B2 | 7/2009 | Chien | |
| 7,778,354 B2 | 8/2010 | Yamaguchi et al. | |
| 8,014,366 B2 | 9/2011 | Wax et al. | |
| 8,036,319 B2 | 10/2011 | Arambepola et al. | |
| 8,036,606 B2 | 10/2011 | Kenington | |
| 8,379,697 B2 | 2/2013 | Sampath et al. | |
| 8,478,222 B2 | 7/2013 | Wortel et al. | |
| 2002/0090909 A1 | 7/2002 | Dapper et al. | |
| 2002/0131523 A1* | 9/2002 | Nagasaka et al. | 375/297 |
| 2003/0031273 A1 | 2/2003 | Mohindra | |
| 2003/0045249 A1 | 3/2003 | Nielsen | |
| 2004/0087279 A1 | 5/2004 | Muschallik et al. | |
| 2004/0242180 A1* | 12/2004 | Beach et al. | 455/323 |
| 2005/0047384 A1* | 3/2005 | Wax et al. | 370/338 |
| 2005/0123064 A1 | 6/2005 | Ben-Ayun et al. | |
| 2006/0063497 A1 | 3/2006 | Nielsen | |
| 2007/0298733 A1 | 12/2007 | Cole et al. | |
| 2008/0025381 A1* | 1/2008 | Lee et al. | 375/219 |
| 2008/0025435 A1 | 1/2008 | Yamaguchi et al. | |
| 2008/0165874 A1* | 7/2008 | Steele et al. | 375/261 |
| 2008/0166985 A1* | 7/2008 | Wortel et al. | 455/233.1 |
| 2008/0219386 A1 | 9/2008 | Chrabieh et al. | |
| 2009/0052556 A1 | 2/2009 | Fernandez | |
| 2009/0116586 A1 | 5/2009 | Arambepola et al. | |
| 2009/0319279 A1* | 12/2009 | Kong et al. | 704/500 |
| 2010/0197231 A1* | 8/2010 | Kenington | 455/63.1 |
| 2011/0026567 A1 | 2/2011 | Sampath et al. | |

FOREIGN PATENT DOCUMENTS

| | | | |
|---|---|---|---|
| CN | 101622845 A | 1/2010 | |
| EP | 1879342 A2 | 1/2008 | |
| EP | 2 088 681 A2 | 8/2009 | |
| JP | 10327209 A | 12/1998 | |
| JP | 2000-101662 | 4/2000 | |
| JP | 2004173281 A | 6/2004 | |
| JP | 2006526348 A | 11/2006 | |
| JP | 200822243 A | 1/2008 | |
| JP | 2008516536 A | 5/2008 | |
| JP | 200944525 A | 2/2009 | |
| JP | 2010516112 A | 5/2010 | |
| WO | 2006044372 A2 | 4/2006 | |
| WO | 2006044372 A3 | 4/2006 | |
| WO | 2008086125 A2 | 7/2008 | |
| WO | 2008086125 A3 | 7/2008 | |
| WO | 2009/082457 A1 | 7/2009 | |
| WO | 2011/037714 A2 | 3/2011 | |
| WO | 2011/037714 A3 | 6/2011 | |

OTHER PUBLICATIONS

Debaillie et al., "Calibration of SDR circuit imperfections", IEEE Global Telecommunications Conference, New Orleans, LA, USA, Nov. 30, 2008-Dec. 4, 2008, 5 pages.

International Search Report and Written Opinion received for PCT Patent Application No. PCT/US2010/046633, mailed on Apr. 15, 2011, 8 pgs.

International Preliminary Report on Patentability and Written Opinion Received for PCT application No. PCT/US2010/046633, mailed on Apr. 5, 2012, 5 Pages.

Office Action received for Chinese Patent Application No. 201010294291.1, mailed on Mar. 6, 2013, 9 Pages of Office Action including 4 pages of English Translation.

Mutha, Shashank et al., "Technique for Joint Balancing of IQ Modulator-Demodulator Chains in Wireless Transmitters", IEEE Microwave Symposium Digest, 2009. MTT'09. IEEE MTT-S International Microwave Symposium, Boston, MA, Jun. 7-12, 2009, pp. 221-224.

Office Action received for Japanese Patent Application No. 2012-530895, mailed on Jun. 11, 2013, 9 pages of Office Action including 4 pages of English Translation.

Office Action received for Japanese Patent Application No. 2012-530895, mailed on Sep. 10, 2013, 7 pages of Office Action including 3 pages of English Translation.

Chen et al. "Adaptive I/Q Imbalance Compensation for RF Transceivers" (IEEE GLOBECOM 2004).

PRC State Intellectual Property Office, Notice of Granting Patent Right for Invention for Chinese Patent Application 201010294291.1, "Calibration of Quadrature Imbalance Via Loopback Phase Shifts" mailed Nov. 6, 2013, and English Translation of the same, 2 pages.

Office Action received for Japanese Patent Application 2012-530895, mailed on Mar. 4, 2014, 8 pages of Office Action including 4 pages of English Translation.

* cited by examiner

CALIBRATION OF QUADRATURE IMBALANCE VIA LOOPBACK PHASE SHIFTS

FIELD

The embodiments herein are in the field of communications. More particularly, the embodiments relate to methods, apparatuses, and systems for calibrating quadrature imbalance in direct conversion transceivers.

BRIEF DESCRIPTION OF THE DRAWINGS

Aspects of the embodiments will become apparent upon reading the following detailed description and upon reference to the accompanying drawings in which like references may indicate similar elements.

DETAILED DESCRIPTION OF EMBODIMENTS

Figure 1:
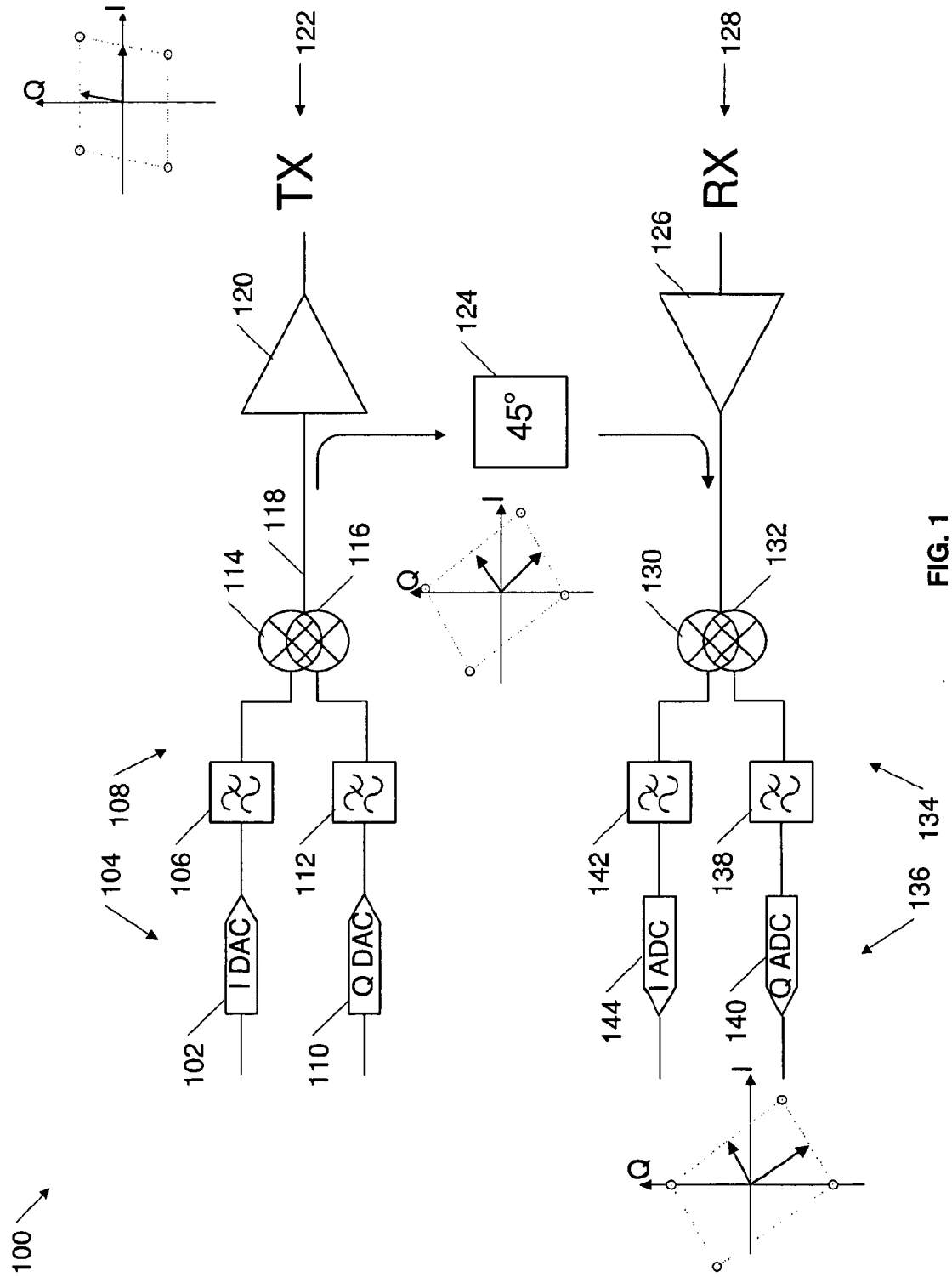
FIG. 1 depicts a direct conversion transceiver.

The following is a detailed description of embodiments depicted in the accompanying drawings. The specification is in such detail as to clearly communicate the embodiments. However, the amount of detail offered is not intended to limit the anticipated variations of embodiments. To the contrary, the intention is to cover all modifications, equivalents, and alternatives consistent with the spirit and scope of the embodiments as defined by the appended claims.

Wireless communications systems often transmit data using an in-phase (I) and quadrature (Q) format. The I- and Q-channels in an IQ signal are phased-shifted relative to each other by 90 degrees, which is known as a quadrature relationship. The IQ format is popular for data transmissions because an IQ signal is capable of carrying two data streams in the frequency bandwidth that is normally required by a single data stream. In other words, the IQ format allows twice the data to be sent over a given frequency bandwidth.

An IQ radio transceiver typically includes separate paths for the I-channel and the Q-channel, both in the transmitter and receiver. For instance, after the signal is received in a single antenna, the signal is split into two separate channels, where the I-channel receiver path can include a first set of mixers, amplifiers, filters, etc. to down-convert and process the I-channel data. Likewise, the Q-channel receiver path can include a second set of mixers, amplifiers, filters, etc. to down-convert and process the Q-channel data.

Quadrature imbalance in the radio receiver or transmitter can impair the ability to successfully receive or transmit high speed data carried by the wireless signal. Quadrature imbalance may occur when the I-channel gain is different from that of the Q-channel, or when the phase relationship between the two channels is not exactly 90 degrees. In other words, quadrature imbalance is caused by gain and/or phase mismatches of the high frequency components in the I- and Q-channels of the IQ transceiver. For example, the receiver components in the I-channel can have slightly different amplitude and/or phase characteristics than the receiver components in the Q channel, introducing imbalance or mismatch errors in the I- and Q-baseband signals. Although the differences are usually small, these gain and phase imbalances reduce the effective signal-to-noise ratio of the IQ receiver, and increase the number of bit errors for a given data rate.

The state-of-the-art in low-cost, low-power wireless transceivers today is the direct conversion architecture. The direct conversion architecture is also susceptible to quadrature imbalance. Due to the use of two physically separate baseband branches, and the generation of high-frequency quadrature signals (0° and 90°), the accuracy of the transmitted signal and the ability to receive accurately are limited by the degree of quadrature imbalance. Quadrature imbalance limits the Error Vector Magnitude (EVM) of the transceiver, which is especially critical in multiple-input and multiple-output (MIMO) systems.

Mass-produced radio frequency integrated circuit (RFIC) systems are usually manufactured in silicon using complementary metal-oxide-semiconductor (CMOS) processes. Variations in the CMOS manufacturing processes contribute greatly to the problem of quadrature imbalance. Transceivers may employ calibration to counter or minimize the effects of quadrature imbalance.

Electronic devices like personal computers, cellular telephones, and personal digital assistants (PDAs) may employ direct conversion receivers to communicate with Wireless Personal Area Networks (WPANs) and Wireless Local Area Networks (WLANs). Additionally, network devices like Wireless Access Points (WAPs) and network routers may also employ direct conversion receivers and direct conversion transmitters to communicate with other devices in the network. The embodiments herein may serve to address quadrature imbalance problems in numerous types of direct conversion transceivers, including transceivers in the electronic devices noted above.

Generally speaking, methods, apparatuses, and systems that calibrate quadrature imbalance in direct conversion transceivers are contemplated. An example system embodiment may be in a mobile computing device with wireless communications capabilities, such as an integrated wireless networking card. The card of the mobile computing device may have a direct conversion transceiver configured to communicate with a variety of wireless networking devices.

During a power-on sequence of the wireless networking card, such as when the card is inserted into the mobile computing device, the networking card may perform a self-calibration to address quadrature imbalance. The networking card may isolate the transmitter and receiver of the card from any antennas, couple the radio frequency (RF) section of the transmitter to the RF section of the receiver via a loopback path, and inject a calibration signal into the transmitter. In the loopback path, the networking card may shift the phase of the signal that propagates through the transmitter using two different phase angles to produce two different signals that exit the RF section of the receiver. By measuring the two different signals that exit the receiver, the network card may be able to calculate correction coefficients, or parameters, which may be used to adjust elements that address or correct the quadrature imbalance for both the transmitter and receiver.

A method embodiment may involve a wireless networking station or other communication device which employs a direct conversion transceiver and performs a calibration to correct quadrature imbalance. The communication device may start by injecting a single-frequency signal into a transmitter of the transceiver to produce a transmitter signal in the RF portion of the transmitter. The transmitter signal, produced by the propagation of the calibration signal through the transmitter, may have quadrature imbalance due to a mismatch of elements in the transmitter.

The communication device may continue by generating a first phase-shifted signal via the transmitter signal and coupling the first phase-shifted signal to the RF portion of a receiver of the transceiver. For example, the communication device may receive the transmitter signal which exits the RF portion of the transmitter and shift the signal by a first phase angle by circuitry in the loopback path. The communication device may continue by storing a first set of parameters of a first receiver signal generated by the first phase-shifted signal. Then the communication device may generate a second phase-shifted signal from the transmitter signal using a second phase angle. In other words, the phase angles of the first and second phase-shifted signals may differ, such as one phase-shifting angle being +45° while the other is −45°.

The communication device may store a second set of parameters of a second receiver signal generated by the second phase-shifted signal. Using the first and second set of parameters, the communication device may calculate correction parameters for quadrature imbalance.

An embodiment of an apparatus comprises a signal generator to generate a single-frequency signal to calibrate for quadrature imbalance in a direct conversion transceiver. For example, the single-frequency signal may generate a transmitter signal from the RF section of a transmitter of the transceiver. The apparatus also comprises a phase-shifting module to receive the transmitter signal and to generate a first phase-shifted signal and a second phase-shifted signal derived from the transmitter signal. The phase-shifting module may be arranged to couple the first and second phase-shifted signals to the RF section of a receiver of the transceiver.

The embodiment of the apparatus comprises a calculation module to calculate, via a first and second set of parameters, correction parameters for correction of the quadrature imbalance. The first set of parameters comprises measurements of a first receiver signal and the second set of parameters comprises measurements of a second receiver signal. Generation of the first receiver signal is via the first phase-shifted signal and generation of the second receiver signal is via the second phase-shifted signal.

An alternative system embodiment may comprise a cellular telephone or other communication device employing a direct conversion transceiver coupled to an antenna. The transceiver comprises a direct conversion transmitter and a direct conversion receiver. A phase-shifting module of the system may receive a transmitter signal from the RF section of the transmitter and generate a first phase-shifted signal and a second phase-shifted signal based on the transmitter signal. In the system embodiment, generation of the transmitter signal is via injection of a single-frequency signal into the transmitter.

The system further includes a calculation module coupled to the receiver. The calculation module is arranged to calculate correction parameters for correction of quadrature imbalance in the transceiver. The calculation module may calculate the correction parameters via a first set of parameters and via a second set of parameters derived from measurement of receiver signals. The receiver signals include a first receiver signal based on the first phase-shifted signal and a second receiver signal based on the second phase-shifted signal.

Various embodiments disclosed herein may be used in a variety of applications. Some embodiments may be used in conjunction with various devices and systems, for example, a transmitter, a receiver, a transceiver, a transmitter-receiver, a wireless communication station, a wireless communication device, a wireless Access Point (AP), a modem, a wireless modem, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, a network, a wireless network, a Local Area Network (LAN), a Wireless LAN (WLAN), a Metropolitan Area Network (MAN), a Wireless MAN (WMAN), a Wide Area Network (WAN), a Wireless WAN (WWAN), devices and/or networks operating in accordance with existing IEEE 802.16e, 802.20, 3 GPP Long Term Evolution (LTE) etc. and/or future versions and/or derivatives and/or Long Term Evolution (LTE) of the above standards, a Personal Area Network (PAN), a Wireless PAN (WPAN), units and/or devices which are part of the above WLAN and/or PAN and/or WPAN networks, one way and/or two-way radio communication systems, cellular radio-telephone communication systems, a cellular telephone, a wireless telephone, a Personal Communication Systems (PCS) device, a PDA device which incorporates a wireless communication device, a Multiple Input Multiple Output (MIMO) transceiver or device, a Single Input Multiple Output (SIMO) transceiver or device, a Multiple Input Single Output (MISO) transceiver or device, a Multi Receiver Chain (MRC) transceiver or device, a transceiver or device having "smart antenna" technology or multiple antenna technology, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), Time-Division Multiplexing (TDM), Time-Division Multiple Access (TDMA), Extended TDMA (E-TDMA), Code-Division Multiple Access (CDMA), Multi-Carrier Modulation (MDM), Discrete Multi-Tone (DMT), Bluetooth®, ZigBee™, or the like. Embodiments may be used in various other apparatuses, devices, systems and/or networks.

Turning now to the drawings, FIG. 1 depicts a direct conversion transceiver 100 having a transmitter 122 and a receiver 128. Receiver 128 is a direct conversion receiver having an amplifier 126. Mixer 130, low-pass filter 142, and analog-to-digital converter (ADC) 144 comprise an I-channel path, while mixer 132, low-pass filter 138, and ADC 140 comprise a Q-channel path. As people possessing ordinary skill in the art will appreciate, numerous elements of transceiver 100 have been omitted from FIG. 1, for the sake of simplicity and ease in understanding. For example, local oscillators at the mixer stages, multiplexers, and digital signal processing (DSP) elements coupled to the ADCs and digital-to-analog converters (DACs) are just some of the elements not depicted in FIG. 1.

Receiver 128 receives an IQ signal at the input to amplifier 126, such as via an antenna coupled to the input. In other words, an antenna receives an IQ signal over the air and transfers the signal to amplifier 126 during operation of receiver 128. Receiver 128 then directly down-converts the IQ signal to baseband, producing I-channel data at the output of ADC 144 and Q-channel data at the output of ADC 140.

The IQ signal carries I-channel data and Q-channel data in the same frequency bandwidth that would normally be needed for a single data stream. The I-channel data and the Q-channel data may be two distinct data streams, or the I- and Q-channels may be interleaved to create a single data stream that occupies only half the normal bandwidth. The IQ signal received by the antenna may be carried on an RF carrier, or some other high frequency carrier suitable for over-the-air transmission. For instance, the IQ signal can be a terrestrial or satellite television (TV) signal, or some other type of communications signal, including a data communications signal. In some situations, the input to amplifier 126 may be coupled to a cable instead of an antenna, such as that used in a cable TV system.

The I-channel portion of receiver 128 down-converts and digitizes a portion of the IQ signal, producing an I-baseband signal. Similarly, the Q-channel portion of receiver 128 down-converts and digitizes a portion of the IQ signal, producing a Q-baseband signal. A DSP (not shown) receives the I- and Q-baseband signals from the ADCs and demodulates the I- and Q-baseband signals to process and retrieve the baseband information. In observing the operation of receiver 128, one may appreciate that receiver 128 has an analog section 134 and a digital section 136.

Transmitter 122 may operate in a similar fashion but in a reverse manner to transmit data. Transmitter 122 is a direct conversion transmitter having an I-channel path and a Q-channel path. The I-channel path of transmitter 122 comprises DAC 102, low pass filter 106, and mixer 114. The Q-channel path comprises DAC 110, low-pass filter 112, and mixer 116. Also similar to receiver 128, transmitter 122 has an analog section 108 and a digital section 104.

The I-channel portion of transmitter 122 takes the I-baseband signal, converts the signal from digital to analog, and up-converts the I-portion of the IQ signal. Similarly, the Q-channel portion of transmitter 122 takes the Q-baseband signal, converts the signal from digital to analog, and up-converts the Q-portion of the IQ signal. Transmitter 122 then mixes and combines the two signals, amplifies the IQ signal via amplifier 120, and transmits the amplified signal, such as by way of an antenna coupled to the output of amplifier 120.

Any gain or phase mismatches between the I path and the Q path may create quadrature imbalance. Quadrature imbalance in either transmitter 122 or receiver 128 can impact the performance of transceiver 100. For example, quadrature imbalance in receiver 128 may reduce the overall signal-to-noise ratio below an acceptable level and increase the bit error rate. In a more specific example, the mixer 130 may have a different amplitude and/or phase characteristic than mixer 132. The differences between the mixers will increase the bit error rate in the resulting I- and Q-baseband signals during demodulation. Similar performance impact may result from other component mismatches, such as gain and/or phase mismatches between the filters 142 and 138, or the ADCs 144 and 140.

FIG. 1 further illustrates a method of calibration that one may employ to alleviate the problem of quadrature imbalance in transceiver 100. Transceiver 100 has a phase-shifting module 124 in an added path, called a loopback path. The loopback path directs the transmitted signal from the output of mixers 114 and 116 into analog section 134 of receiver 128. The added loopback path of transceiver 100 includes a fixed phase-shift of an arbitrary phase, here 45°. Other transceivers may include other fixed phase-shift values. For example, other transceivers may use a different arbitrary phase-shift, wherein that phase-shift does not equal a multiple of 90°.

Quadrature imbalance may be treated as a complex-plane operation which can be represented in matrix form:

$$\begin{bmatrix} I' \\ Q' \end{bmatrix} = \begin{bmatrix} \alpha & \beta \\ 0 & 1 \end{bmatrix} \cdot \begin{bmatrix} I \\ Q \end{bmatrix}; \quad \alpha \sim 1; \quad |\beta| << 1$$

In the matrix representation, $\alpha$ is the gain imbalance factor and $\beta$ is the phase imbalance factor. For a transceiver using RF loopback with a phase shift, such loopback is equivalent to multiplying three matrices in order:

$$\begin{bmatrix} I' \\ Q' \end{bmatrix} = \begin{bmatrix} \alpha_{RX} & \beta_{RX} \\ 0 & 1 \end{bmatrix} \cdot \begin{bmatrix} \cos(\varphi_{LB}) & \sin(\varphi_{LB}) \\ -\sin(\varphi_{LB}) & \cos(\varphi_{LB}) \end{bmatrix} \cdot \begin{bmatrix} \alpha_{TX} & \beta_{TX} \\ 0 & 1 \end{bmatrix} \cdot \begin{bmatrix} I \\ Q \end{bmatrix};$$

$$N \cdot 90° \neq \varphi_{LB} \neq 0°$$

In the matrices above, $\alpha_{RX}$ and $\alpha_{TX}$ are the gain imbalance factors for receiver 128 and transmitter 122, respectively. $\beta_{RX}$ and $\beta_{TX}$ are the phase imbalance factors for receiver 128 and transmitter 122, respectively. $\phi_{LB}$ is the loopback phase-shift.

Transceiver 100 may employ a method for measuring the matrix coefficients. For example, transceiver 100 may use correlation in the digital domain to determine I' and Q'. Further, transceiver 100 knows the matrix coefficients of the transmitted signal, I and Q, and knows the amount of loopback phase shift ($\phi_{LB}=45°$ in the example of FIG. 1). Transceiver 100 may use four equations to solve for four variables. Using four equations to solve for the four unknown variables enables the system to be analytically solved. That is to say, transceiver 100 possesses enough information to solve for $\alpha_{RX}$, $\alpha_{TX}$, $\beta_{RX}$, and $\beta_{TX}$.

Various embodiments may extend the aforementioned methodology to solve for $\alpha_{RX}$, $\alpha_{TX}$, $\beta_{RX}$, and $\beta_{TX}$. The embodiments may further enable solving for $\alpha_{RX}$, $\alpha_{TX}$, $\beta_{RX}$, and $\beta_{TX}$ without requiring exact knowledge of the phase shift. Because many transceiver systems may comprise practical, mass-produced, transceiver circuits with all the accompanying circuit variations due to component tolerances, knowing exactly the phase shift may generally pose a serious challenge.

Figure 2:
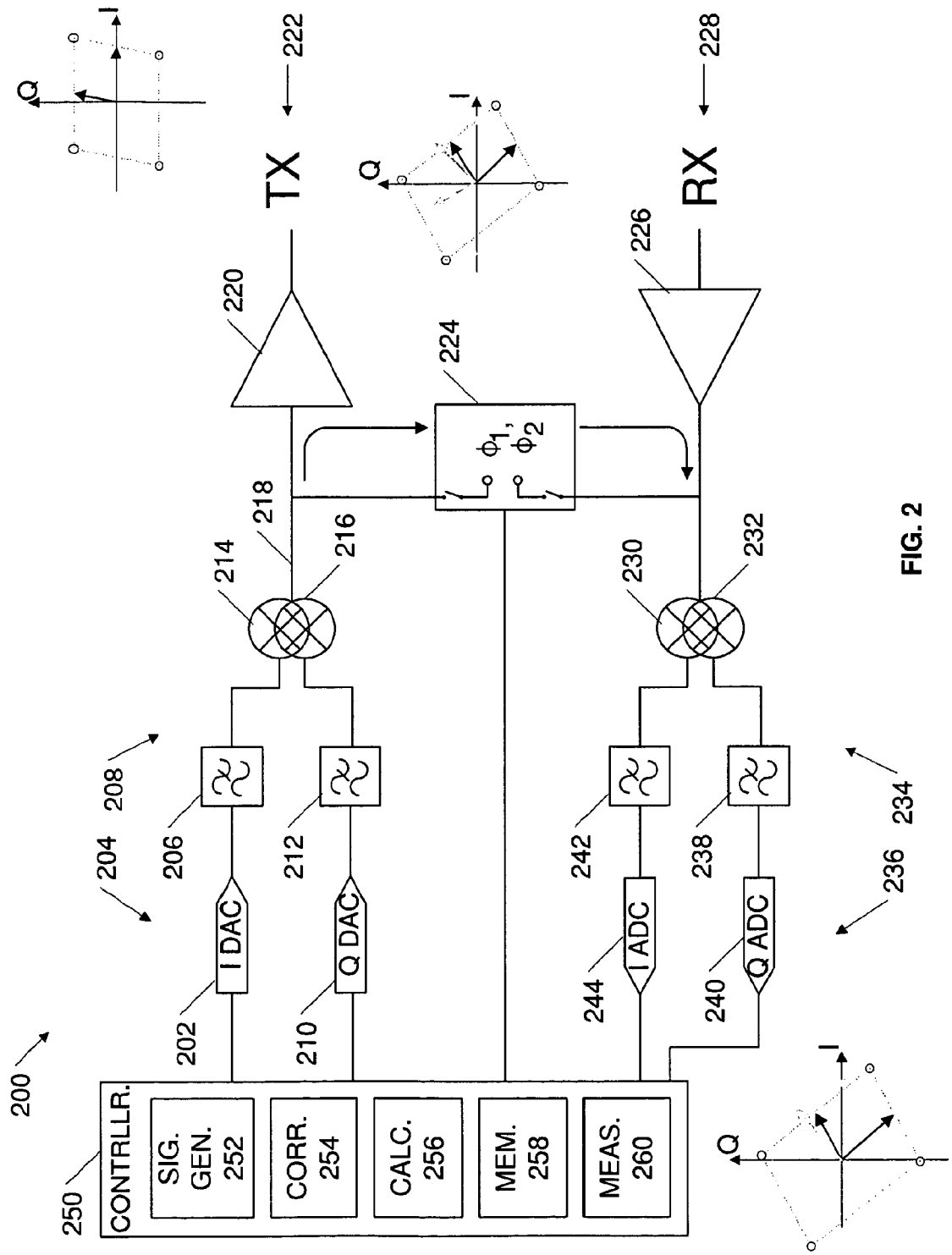
FIG. 2 illustrates how a direct conversion transceiver may calibrate quadrature imbalance in one embodiment.

FIG. 2 illustrates how a direct conversion transceiver 200 may perform a calibration to alleviate quadrature imbalance according to one embodiment. Transceiver 200 may perform a calibration to alleviate quadrature imbalance without precisely knowing the phase shift angles used during the calibration process. By inspection, one may note that transceiver 200 in FIG. 2 is similar in many respects to transceiver 100 in FIG. 1.

Transceiver 200 also comprises a direct conversion transmitter 222 and a direct conversion receiver 228. Mixers 230 and 232, low-pass filters 242 and 238, and ADCs 244 and 240 comprise the I-channel path and Q-channel paths of receiver 228, respectively, as described in the discussion for FIG. 1. Similarly, transmitter 222 has an I-channel path and a Q-channel path. The I-channel path of transmitter 222 comprises DAC 202, low pass filter 206, and mixer 214. The Q-channel path of transmitter 222 comprises DAC 210, low-pass filter 212, and mixer 216. Receiver 228 has a digital section 236 and an analog section 234, while transmitter 222 has an analog section 208 and a digital section 204. As with transceiver 100, the components in the I- and Q-channel paths of receiver 228 and transmitter 222 may be sources of quadrature imbalance.

Additionally, transceiver 200 has a quadrature calibration controller 250 in the digital section and a different phase-shifting module 224 in the RF section. Calibration controller 250 may direct or control the calibration process, manipulating phase-shifting module 224 to inject signals having different phase shift angles into receiver 228.

Transceiver 200 comprises a signal generator 252 to generate a clean single-frequency calibration signal. For the embodiment depicted in FIG. 1, signal generator 252 comprises an internal digital frequency source. In alternative embodiments, the signal generator may comprise an analog source. For example, in one alternative embodiment, an analog signal generator module may inject a calibration signal into the I- and Q-channel paths between the DACs (202 & 210) and the low-pass filters (206 & 212). In other words, the alternative embodiment may ignore any gain and/or phase mismatches associated with DAC 202 and DAC 210 and only correct the effects of quadrature imbalance associated with the remaining components in the I- and Q-channel paths.

As noted, transceiver 200 also comprises phase-shifting module 224 in a loopback path which couples analog section 208 of transceiver 222 to analog section 234 of receiver 228 during calibration. That is to say, during normal operation, phase-shifting module 224 may be isolated from analog sections 208 and 234. During calibration, however, calibration controller 250 may couple phase-shifting module 224 to analog sections 208 and 234 by closing solid state switches, switching between multiplexer inputs, or activating other switching devices.

During calibration of transmitter 222 and receiver 228, calibration controller 250 may activate signal generator 252 and enable signal generator 252 to inject the single-frequency signal into DAC 202 and DAC 210. Upon exiting the digital section 204, the calibration signal may propagate through low-pass filters 206 and 212, as well as mixers 214 and 216. In propagating through the DACs, the filters, and the mixers, the component mismatches may cause a quadrature imbalance for the calibration signal, resulting in an altered signal at node 218. The altered signal at node 218 may be referred to as the transmitter signal.

Calibration controller 250 may cause phase-shifting module 224 to generate a first phase-shifted signal based on the transmitter signal. In other words, the transmitter signal may propagate from node 218 into phase-shifting module 224. Phase-shifting module 224 may shift the phase of the transmitter signal by a first phase-shift angle ($\Phi_1$) to produce the first phase-shifted signal. The first phase-shifted signal may enter the RF portion of receiver 228 via the loopback path, at the input to mixers 230 and 232. The first phase-shifted signal may propagate through the I- and Q-channel elements of receiver 228, producing a first receiver signal at the outputs of ADC 244 and ADC 240.

As the first receiver signal moves from analog section 234 into digital section 236 by exiting the ADCs, calibration controller 250 may measure a first set of parameters via measurement module 260. Measurement model 260 may take numerous samples of the digital values produced by ADC 244 and ADC 240. From the numerous samples, calculation module 256 may be able to determine the magnitude of the first receiver signal. In other words, calculation module 256 may be able to determine I' and Q' for the first receiver signal. Calibration controller 250 may store the first set of parameters for the first receiver signal into memory module 258.

Further, measurement module 260 may also take numerous samples of the digital values produced by signal generator 252 during the calibration process. Stated differently, calculation module 256 may be able to determine I' and Q' for the first receiver signal, as well as have knowledge of the I and Q parameters that were used during the creation and measurement of the I' and Q' parameters. Worth noting, alternative embodiments may not necessarily use measurement module 260 to obtain the I and Q parameters. For example, it may not be necessary to measure the values if the calibration signal is fixed and will not vary. Such I and Q parameters may comprise fixed, stored parameters in memory module 258 or calculation module 256.

Calibration controller 250 may then cause phase-shifting module 224 to generate a second phase-shifted signal based on the transmitter signal. That is to say, phase-shifting module 224 may switch to a second mode of operation and shift the phase of the transmitter signal by a second phase-shift angle ($\phi_2$), producing a second phase-shifted signal. Calibration controller 250 may measure a second set of parameters at measurement module 260 related to the second phase-shifted signal. From the numerous samples, calculation module 256 may be able to determine the magnitude of the second receiver signal. Stated differently, calculation module 256 may be able to determine I' and Q' for the second receiver signal. Calibration controller 250 may store the second set of parameters for the second receiver signal into memory module 258.

Calibration controller 250 may then use the first and second set of stored parameters in memory module 258 to calculate correction parameters. The calculated correction parameters may enable calibration controller 250 to calibrate transmitter 222 and receiver 228 for quadrature imbalance via the first and second set of parameters. For example, calibration controller 250 may comprise internal digital elements in correction module 254 that enable correction of quadrature errors in transmitter 222 and receiver 228. In alternative embodiments, a transceiver may calibrate the transmitter and/or receiver in a different manner. For example, instead of employing solely digital elements in the digital section, calibration controller 250 may instead use the calculated correction parameters to adjust elements in the analog sections, such as phase compensation components and gain compensation components.

The embodiment depicted in FIG. 2 employs digital correction for phase imbalance and gain imbalance correction. Once the correction parameters are calculated for transmitter 222, correction module 254 may take the one or more of the digital values that would otherwise be transferred to DAC 202 or 210 without correction, adjust the digital value(s) based on the correction parameters, and transfer the adjusted digital value(s) to DAC 202 and/or 210. Correction module 254 may operate in a similar but reverse manner for receiving digital signals from ADC 244 and 240.

Figure 3:
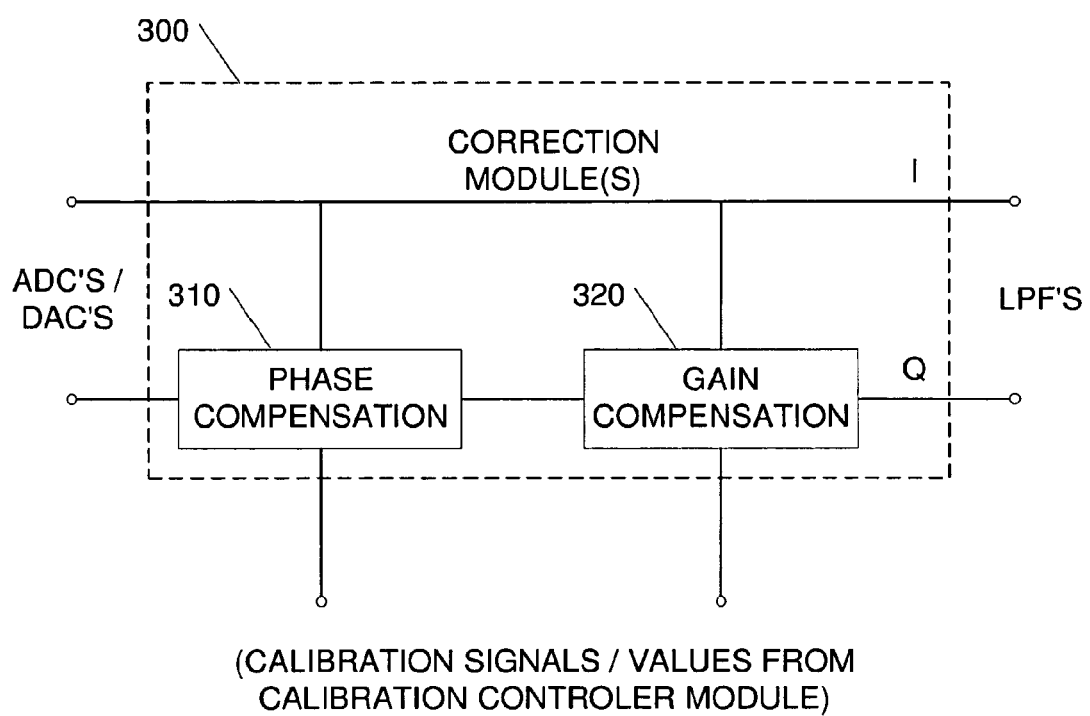
FIG. 3 depicts a correction module that may be used in an alternative embodiment.

An alternative embodiment of a correction module 300 is depicted in FIG. 3. Instead of being employed in the digital portion of a transceiver, correction module 300 may correct gain imbalance and phase imbalance errors in analog section 208 or 234. For example, correction module 300 comprises a phase compensation module 310 and a gain compensation module 320. Correction module 300 may be inserted between low-pass filters (206, 212; 242, 238) and the DAC or ADC elements (202, 210; 244, 240). Based on the calculated correction parameters, correction module 300 may adjust the phase or gain of the signal transferred to the low-pass filters or to the DAC/ADC elements.

FIG. 2 and the associated discussion illustrate how calibration controller 250 and phase-shifting module 224 may operate in together to create a new set of equations to solve:

$$\begin{bmatrix} I' \\ Q' \end{bmatrix} = A_1 \cdot \begin{bmatrix} \alpha_{RX} & \beta_{RX} \\ 0 & 1 \end{bmatrix} \cdot \begin{bmatrix} \cos(\varphi_{LB,1}) & \sin(\varphi_{LB,1}) \\ -\sin(\varphi_{LB,1}) & \cos(\varphi_{LB,1}) \end{bmatrix} \cdot \begin{bmatrix} \alpha_{TX} & \beta_{TX} \\ 0 & 1 \end{bmatrix} \cdot \begin{bmatrix} I \\ Q \end{bmatrix},$$

and

-continued $$\begin{bmatrix} I' \\ Q' \end{bmatrix} = A_2 \cdot \begin{bmatrix} \alpha_{RX} & \beta_{RX} \\ 0 & 1 \end{bmatrix} \cdot \begin{bmatrix} \cos(\varphi_{LB,2}) & \sin(\varphi_{LB,2}) \\ -\sin(\varphi_{LB,2}) & \cos(\varphi_{LB,2}) \end{bmatrix} \cdot \begin{bmatrix} \alpha_{TX} & \beta_{TX} \\ 0 & 1 \end{bmatrix} \cdot \begin{bmatrix} I \\ Q \end{bmatrix},$$

with $$\varphi_{LB,1} \neq \varphi_{LB,2}.$$

Allowing, without loss of generality, the two phase-shift states (one state based on ($\phi_{LB,1}$ and one state based on $\phi_{LB,2}$) to have different gain levels, one may observe that eight equations remain to be solved using eight measurements. The eight equations to solve are the two gain imbalance parameters ($\alpha_{RX}$ and $\alpha_{TX}$), the two phase imbalance parameters ($\beta_{RX}$ and $\beta_{TX}$), the two loopback phases ($\phi_{LB,1}$ and $\phi_{LB,2}$) and the two overall gains ($A_1$ and $A_2$) using eight measurements (two I' parameters, two Q' parameters, two I parameters, and two Q parameters for the two states). The equations for the two states are analytically solvable, and no knowledge of the loopback phases or the gains is needed to solve the equations and determine the values of $\alpha_{RX}$, $\alpha_{TX}$, $\beta_{RX}$, and $\beta_{TX}$.

In many embodiments the switchable-phase element, phase-shifting module 224, may be implemented using a Poly-Phase Filter (PPF). The PPF may provide two differential outputs with a 90° phase offset between the two. Each stage of the PPF may add 45° to the overall phase shift of the filter. So, by choosing either one differential output or the other (for an odd number of stages) or by choosing to add or subtract the two output signals (for an even number of stages) one may generate the two phases reliably using mostly passive elements. Because phase-shifting module 224 may perform the switch in the RF sections, the switching may not generally impact the quadrature imbalance of either the transmitter or the receiver.

Figure 4:
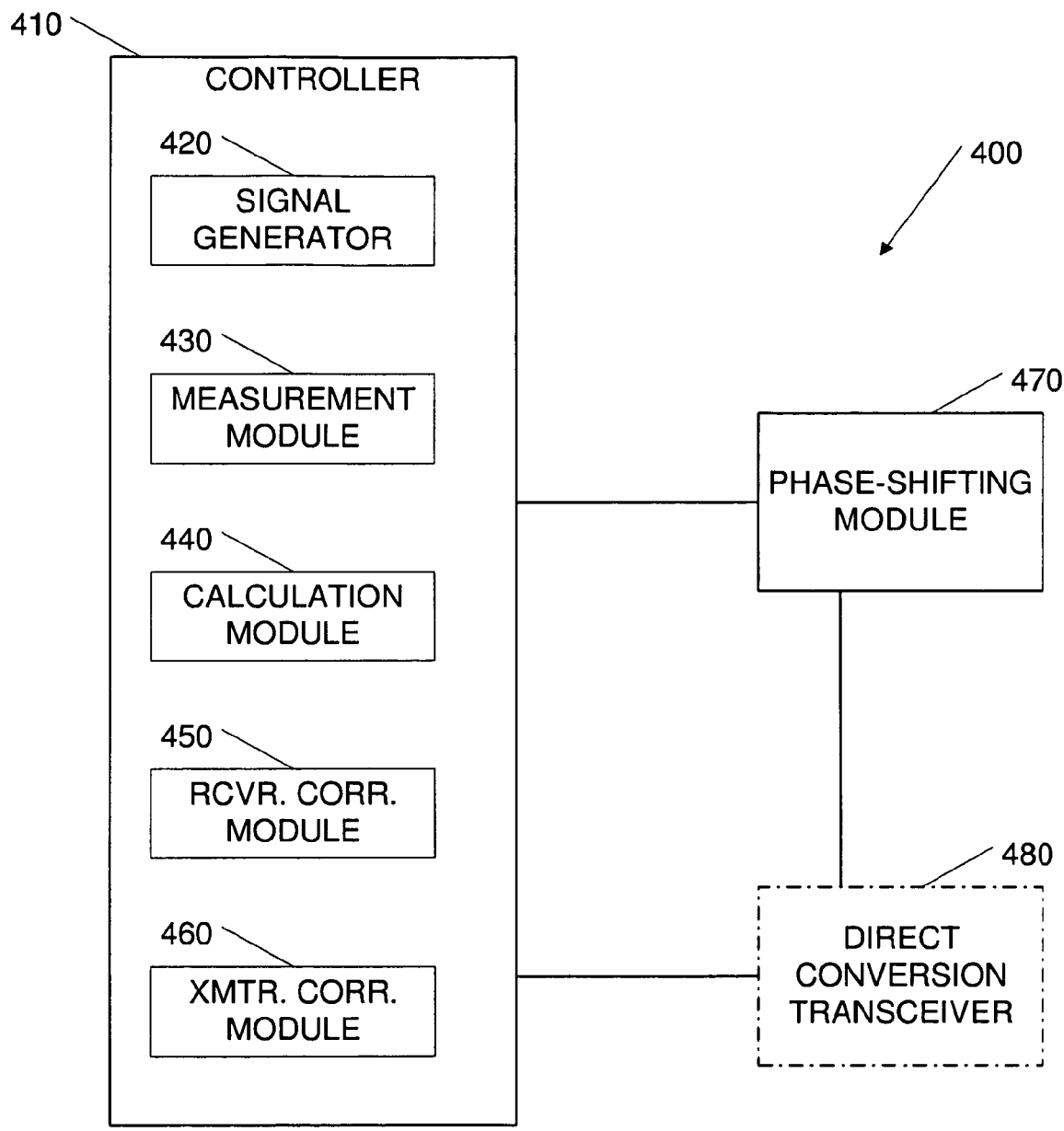
FIG. 4 depicts one embodiment of an apparatus that may calibrate quadrature imbalance in a direct conversion transceiver.

FIG. 4 depicts one embodiment of an apparatus 400 that may calibrate transmitter and/or receivers in a direct conversion transceiver 480. For example, apparatus 400 may comprise, or at least form a part of, a wireless network communication device, such as a wireless access point device. With reference to FIG. 2, controller 410 may correspond to calibration controller 250, while phase-shifting module 470 may correspond to phase-shifting module 224. One or more elements of apparatus 400 may be in the form of hardware, software, or a combination of both hardware and software. For example, in the embodiment depicted in FIG. 4, one or more portions of calculation module 440 may comprise instruction-coded modules stored in one or more memory devices. For example, the modules may comprise software or firmware instructions of an application in a DSP that employs a microprocessor for performing complex calculations.

In alternative embodiments, one or more of the modules of apparatus 400 may comprise hardware-only modules. For example, signal generator 420, measurement module 430, calculation module 440, receiver correction module 450, transmitter correction module 460, and phase-shifting module 470 may each comprise a portion of an integrated circuit chip. In such embodiments, one or more of the modules may comprise such hardware elements as resistors, capacitors, inductors, diodes, CMOS transistors, analog transistors, combinations of logic gates, and state machines.

In even further alternative embodiments, one or more of the modules of apparatus 400 may comprise a combination of hardware and software modules. For example, controller 410 may comprise firmware-encoded instructions executed by a processor, when the processor works in conjunction with a state machine which directs the overall calibration process and controls the various elements, and performs calculations to determine the values of the correction parameters after the measurement of the sets of parameters have been stored by measurement module 430.

Signal generator 420 may generate the calibration signal to be injected into the receiver. As noted previously, signal generator 420 may be a digital signal generator in some embodiments or an analog signal generator in other embodiments. In many embodiments, signal generator 420 may comprise a fixed signal generator. However, in other embodiments, signal generator 420 comprise a variable signal generator, wherein controller 410 may be able to select a particular calibration signal frequency or calibration signal amplitude.

In many embodiments, measurement module 430 may comprise buffers or series of memory elements coupled to a status register associated with an ADC. When triggered by controller 410, measurement module 430 may be configured to store a series of values retrieved from the status register during a cycle of the received signal and store the values in the memory elements for later retrieval for the subsequent calculations. In many embodiments, measurement module 430 may comprise dynamic random access memory (DRAM) to store the measured sets of parameters. In some embodiments, measurement module 430 may employ another type of memory to store the measured sets of parameters, such as static RAM or flash memory.

As noted, calculation module 440 may retrieve the first and second sets of parameters and use them to determine the values for the correction parameters. In many embodiments, calculation module 440 may comprise a state machine. In alternative embodiments, calculation module 440 may comprise a dedicated processor, such as a microcontroller of an application specific integrated circuit (ASIC) coupled with controller 410.

In the embodiment of FIG. 4, apparatus 400 comprises a controller 410 that employs two correction modules, 450 and 460. Receiver correction module 450 may be dedicated for calibration of the receiver for transceiver 480 based on the calculated calibration parameters. Similarly, transmitter correction module 460 may be dedicated for calibration of the transmitter of correction module 480 based on the calculated calibration parameters. As noted previously, the correction modules may be implemented digitally or in an analog fashion in different embodiments.

The number of modules in an embodiment of apparatus 400 may vary. Some embodiments may have fewer modules than those module depicted in FIG. 4. For example, one embodiment may integrate receiver correction module 450 and transmitter correction model 460 into a single module. Further embodiments may include more modules or elements than the ones shown in FIG. 4. For example, an alternative embodiment may include two or more measurement modules, such as an embodiment that employs one measurement per each channel. Other embodiments may include more of the other modules.

Figure 5:
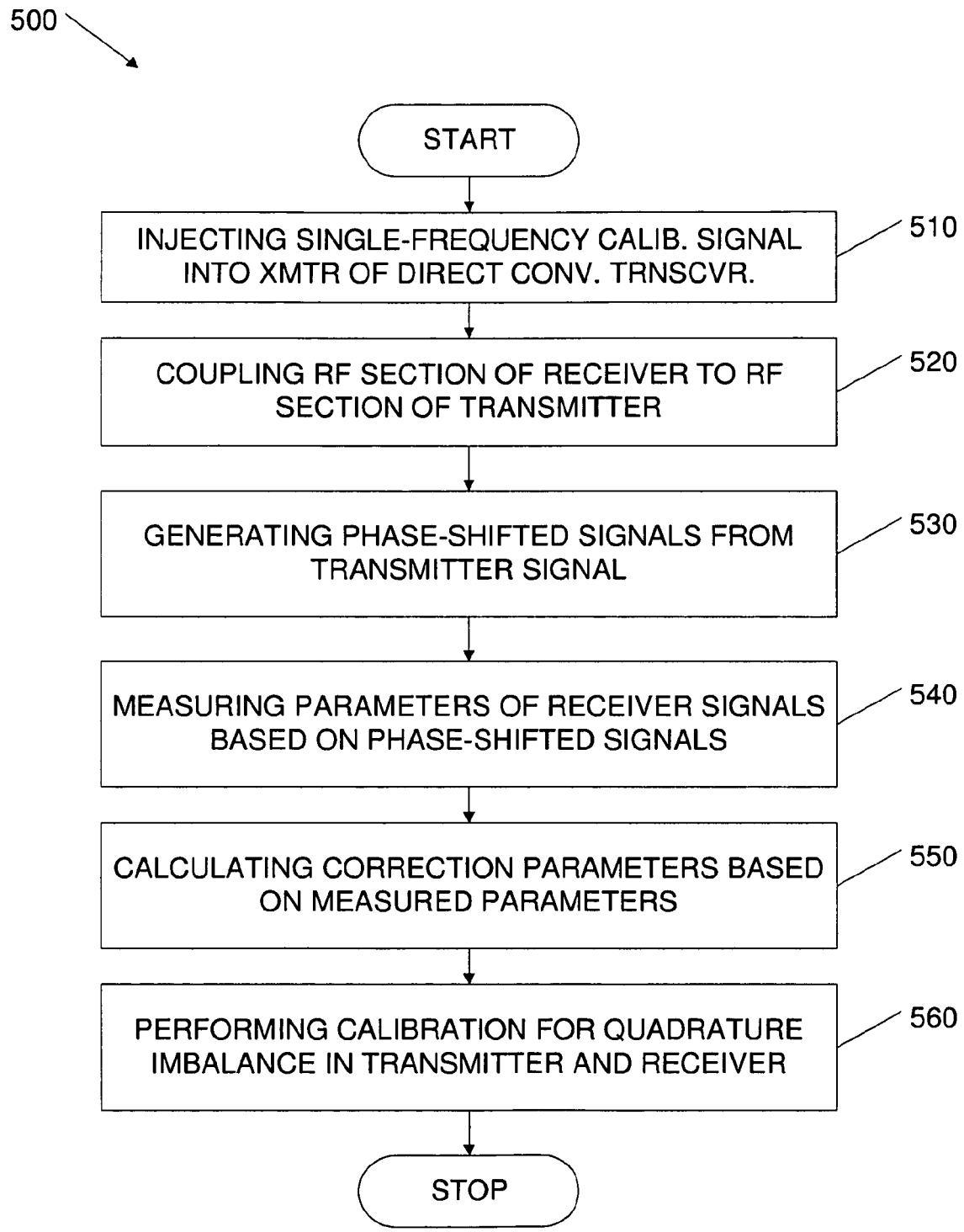
FIG. 5 illustrates a method for calibrating quadrature imbalance in direct conversion transceivers.

FIG. 5 depicts a flowchart 500 illustrating a method for calibrating quadrature imbalance in direct conversion transceivers. Flowchart 500 begins with injecting a single-frequency calibration signal into a transmitter of a direct conversion transceiver (element 510). For example, signal generator 252 of FIG. 2 may generate a digital single-frequency calibration signal, comprising I-component values and Q-component values. During a calibration process, calibration controller 250 may couple the outputs of signal generator 252 to digital section 204 of transmitter 222, enabling signal generator 252 to transfer the I-component values and Q-component values to DAC 202 and DAC 210.

The method according to flowchart 500 also includes coupling the transceiver RF sections together (element 520), which enables the calibration signal to propagate through the transmitter and back through the receiver. Again referring to FIG. 2, calibration controller 250 may switch the states of several transistors, which cause a loopback path to be created between the analog sections 208 and 234. Upon coupling the transceiver analog sections together (element 520), an embodiment according to flowchart 500 involves generating phase-shifted signals from the transmitter signal (element 530). Continuing with the previous example, calibration controller 250 may manipulate phase-shifting module 224, causing phase-shifting module 224 to shift the phase of the transmitter signal exiting mixers 214 and 216. Phase-shifting module 224 may first shift the phase of the transmitter signal by a first phase angle of 45°. During a later sequence of the calibration process, calibration controller 250 may manipulate phase-shifting module 224 and cause phase-shifting module 224 to shift the phase of the transmitter signal by a second phase-shift angle of −45°. The 45° and −45° phase-shift angles are only for one embodiment. Other embodiments may use two other angles.

The method according to flowchart 500 also includes measuring parameters of receiver signals based on the phase shifted signals (element 540). Again continuing with the example, as the first phase-shifted signal propagates back through receiver 228, the components of receiver 228 will alter the signal and produce a first receiver signal having slightly altered phase and gain values. Calibration controller 250 may operate measurement module 260 to sample and store digitally-sampled values for the digital waveform values of the first receiver signal that ADC 244 and ADC 240 transfer to calibration controller 250.

After calibration controller 250 operates or manipulates phase-shifting module 224 to shift the phase of the transmitter signal by the second angle of −45°, calibration controller 250 may again operate measurement module 260 to sample and store digitally-sampled values for the digital waveform values of the second receiver signal that ADC 244 and ADC 240 transfer to calibration controller 250. Further, and at or about the same time, calibration controller 250 may operate measurement module 260 to sample and store digitally-sampled values for the calibration signal from signal generator 252.

The method according to flowchart 500 also comprises calculating correction parameters based on the first and second sets of measured parameters or sampled values (element 550). Again continuing with our example, calculation module 256 may solve eight equations using eight measurements. Calculation module 256 may solve for the two gain imbalance parameters ($\alpha_{RX}$ and $\alpha_{TX}$), the two phase imbalance parameters ($\beta_{RX}$ and $\beta_{TX}$), the two loopback phases ($\phi_{LB,1}$ and $\phi_{LB,2}$), and two overall gains ($A_1$ and $A_2$).

Calculation module 256 may solve the eight equations using the eight measurements obtained from sampling the two I' parameters, the two Q' parameters, the two I parameters, and the two Q parameters for the two states (one state with a phase shift of 45°, the other state with the phase shift of −45°. Calculation module 256 may analytically solve the equations for the two states having no knowledge of the loopback phases or the gains and determine the values of $\alpha_{RX}$, $\alpha_{TX}$, $\beta_{RX}$, and $\beta_{TX}$.

The method according to flowchart 500 also comprises performing calibration for quadrature imbalance in the transmitter and receiver (element 560). For example with reference to FIG. 4, controller 410 may comprise internal digital elements in receiver correction module 450 and transmitter correction module 460 that enable correction of quadrature errors in the transmitter and receiver of transceiver 480.

As noted earlier, one or more portions of some embodiments may be implemented as a program product stored in a tangible medium for use with a process to perform operations for processes, such as the processes described in conjunction with apparatus 400 illustrated in FIG. 4. The program(s) of the program product defines functions of the embodiments (including the methods described herein) and may be contained on a variety of data-bearing media. Illustrative data-bearing media include, but are not limited to: (i) information permanently stored on non-writable storage media (e.g., read-only memory devices within a station); and (ii) alterable information stored on writable storage media (e.g., flash memory). Such data-bearing media, when carrying computer-readable instructions that direct the functions of devices or systems, represent elements of some embodiments of the present invention.

In general, the routines executed to implement the embodiments, may be part of an operating system or a specific application, component, program, module, object, or sequence of instructions. The computer program of an embodiment may be comprised of a multitude of instructions that will be translated by a computer into a machine-readable format and hence executable instructions. Also, programs may be comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus a specific embodiment should not be limited to use solely in any specific application identified and/or implied by such nomenclature.

It will be apparent to those skilled in the art having the benefit of this disclosure that the embodiments herein contemplate systems, apparatuses, and methods for calibration of quadrature imbalance via loopback phase shifts. It is understood that the form of the embodiments shown and described in the detailed description and the drawings are to be taken merely as examples. It is intended that the following claims be interpreted broadly to embrace all the variations of the embodiments disclosed.

Although some aspects have been described in detail for some embodiments, it should be understood that various changes, substitutions and alterations can be made herein without departing from the spirit and scope of the embodiments as defined by the appended claims. Although one embodiment may achieve multiple objectives, not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure of the embodiments, processes, machines, manufacture, compositions of matter, means, methods, or steps, presently existing or later to be developed that perform substantially the same function or achieve substantially the same result as the corresponding embodiments described herein may be utilized according to the embodiments herein. Accordingly, the appended claims are intended to include within their scope such processes, machines, manufacture, compositions of matter, means, methods, or steps.

What is claimed is:

1. A method, comprising:

injecting a single-frequency signal including an I-channel and a Q-channel into a transmitter of a direct conversion transceiver to produce a transmitter signal in the radio frequency (RF) portion of the transmitter;

generating two phase-shifted signals via the transmitter signal, wherein the generating the two phase-shifted signals comprises:

generating a first phase-shifted signal via adding a first phase shift to the transmitter signal; and generating a second phase-shifted signal via adding a second phase shift to the transmitter signal;

coupling the two phase-shifted signals to the RF portion of a receiver of the direct conversion transceiver via a portion of a loopback path located between the RF portion of the transmitter and an RF portion of a receiver, the generating of the two phase-shifted signals occurring in the portion of the loopback path located between the RF portion of the transmitter and the RF portion of the receiver;

measuring two receiver signals, from the receiver, generated by the two phase-shifted signals, the measuring comprising measuring both the I-channel and the Q-channel;

determining a set of parameters based upon the measured two receiver signals; and calculating correction parameters for quadrature imbalance for both the transmitter and the receiver via the set of parameters, wherein the correction parameters relate to correcting phase imbalance and gain imbalance for both the transmitter and the receiver and wherein the determining the set of parameters and calculating the correction parameters for both the phase imbalance and gain imbalance for both the transmitter and the receiver are based on the two phase-shifted signals generated in the portion of the loopback path located between the RF portion of the transmitter and the RF portion of the receiver.

2. The method of claim 1, further comprising: adjusting a plurality of digital elements based on the correction parameters to calibrate the transmitter and the receiver.

3. The method of claim 2, wherein:

the measuring comprises measuring the receiver signals generated by the first phase-shifted signal and generated by the second phase-shifted signal, the measuring comprising measuring both the I-channel and the Q-channel;

the determining comprises determining a set of parameters based upon the measured receiver signals; and the calculating comprises calculating correction parameters for quadrature imbalance for both the transmitter and the receiver via the set of receiver signal parameters.

4. The method of claim 3, wherein:

the calculating comprises solving the following pairs of equations:

$$\begin{bmatrix} I'_1 \\ Q'_1 \end{bmatrix} = A_1 \cdot \begin{bmatrix} \alpha_{Rx} & \beta_{Rx} \\ 0 & 1 \end{bmatrix} \cdot \begin{bmatrix} \cos(\varphi_1) & \sin(\varphi_1) \\ -\sin(\varphi_1) & \cos(\varphi_1) \end{bmatrix} \begin{bmatrix} \alpha_{Tx} & \beta_{Tx} \\ 0 & 1 \end{bmatrix} \cdot \begin{bmatrix} I_1 \\ Q_1 \end{bmatrix}$$

$$\begin{bmatrix} I'_2 \\ Q'_2 \end{bmatrix} = A_2 \cdot \begin{bmatrix} \alpha_{Rx} & \beta_{Rx} \\ 0 & 1 \end{bmatrix} \cdot \begin{bmatrix} \cos(\varphi_2) & \sin(\varphi_2) \\ -\sin(\varphi_2) & \cos(\varphi_2) \end{bmatrix} \begin{bmatrix} \alpha_{Tx} & \beta_{Tx} \\ 0 & 1 \end{bmatrix} \cdot \begin{bmatrix} I_2 \\ Q_2 \end{bmatrix}$$

where $I_1$ and $I_2$ are the I-channels of the transmitter signals, the $Q_1$ and $Q_2$ are the transmitter signal Q-channels, the $I_1'$ and $I_2'$ are the I-channels of the receiver signal I-channel, the $Q_1'$ and $Q_2'$ are the receiver signal Q-channels, $\phi_1$ is the phase-shift angle for the first phase-shifted signal, $\phi_2$ is the phase-shift angle for the second phase-shifted signal, $A_1$ and $A_2$ are the overall gains, $\alpha_{Tx}$ and $\alpha_{Rx}$ are the two gain imbalance parameters, and $\beta_{Tx}$ and $\beta_{Rx}$ are the two phase imbalance parameters.

5. The method of claim 1, wherein:

the generating comprises generating the first phase-shifted signal with a known phase-shift angle;

the one or two receiver signals comprises a receiver signal generated by the first phase-shifted signal;

the measuring comprises measuring the receiver signal, the measuring comprising measuring both the I-channel and the Q-channel of the receiver signal;

the determining comprises determining the set of parameters based upon the measured receiver signal; and the calculating comprises calculating correction parameters for quadrature imbalance for both the transmitter and the receiver via the set of parameters.

6. The method of claim 5, wherein:

the calculating comprises solving the following equation:

$$\begin{bmatrix} I' \\ Q' \end{bmatrix} = \begin{bmatrix} \alpha_{Rx} & \beta_{Rx} \\ 0 & 1 \end{bmatrix} \cdot \begin{bmatrix} \cos(\varphi_1) & \sin(\varphi_1) \\ -\sin(\varphi_1) & \cos(\varphi_1) \end{bmatrix} \cdot \begin{bmatrix} \alpha_{Tx} & \beta_{Tx} \\ 0 & 1 \end{bmatrix} \cdot \begin{bmatrix} I \\ Q \end{bmatrix}$$

where I is the transmitter signal I-channel, Q is the transmitter signal Q-channel, I' is a receiver signal I-channel, Q' is the receiver signal Q-channel, $\phi_1$ is the known phase-shift angle for the phase-shifted signal, $\alpha_{Tx}$ and $\alpha_{Rx}$ are gain imbalance parameters for the transmitter and receiver, respectively, and $\beta_{Tx}$ and $\beta_{Rx}$ are phase imbalance parameters for the transmitter and receiver, respectively.

7. The method of claim 1, wherein the calculating correction parameters comprises calculating correction parameters for quadrature imbalance for both the transmitter and the receiver via the set of parameters and via a set of parameters based upon determining the I-channel and the Q-channel of the transmitter signal.

8. The method of claim 7, wherein the determining the I-channel and the Q-channel of the transmitter signal comprises measuring the I-channel and the Q-channel of the transmitter signal.

9. The method of claim 7, wherein the determining the I-channel and the Q-channel of the transmitter signal comprises determining the I-channel and the Q-channel of the transmitter signal based upon known signal values of the transmitter signal.

10. An apparatus, comprising:

a signal generator to generate a single-frequency signal including an I-channel and a Q-channel to calibrate for quadrature imbalance in a direct conversion transceiver, wherein the single-frequency signal generates a transmitter signal from the radio frequency (RF) section of a transmitter of the transceiver;

a loopback module located between the RF section of the transmitter and an RF section of a receiver to receive the transmitter signal and to generate two phase-shifted signals based upon the transmitter signal, wherein the loopback module is arranged to couple the two phase-shifted signals to the RF section of the receiver of the transceiver, the loopback module to generate a first phase-shifted signal of the two phase-shifted signals via adding a first phase shift to the transmitter signal and to generate a second phase-shifted signal of the two phase-shifted signals via adding a second phase shift to the transmitter signal;

a parameter module coupled to the receiver to determine a set of parameters based upon the two receiver signals generated from the two phase-shifted signals generated by the loopback module located between the RF section of the transmitter and the RF section of the receiver;

a calculation module to calculate, via the set of parameters based on the two receiver signals, correction parameters for correction of the quadrature imbalance;

a receiver correction module to correct quadrature imbalance of the receiver; and a transmitter correction module to correct quadrature imbalance of the transmitter, wherein the receiver correction module and the transmitter correction module are to base corrections on the parameters based on the two phase-shifted signals generated by the loopback module located between the RF section of the transmitter and the RF section of the receiver.

11. The apparatus of claim 10, further comprising a digital signal processor (DSP) directly coupled to the calculation module, the DSP to control the calculation module during quadrature calibration.

12. The apparatus of claim 10, wherein the parameter module is to determine the set of parameters by measuring the two receiver signals.

13. The apparatus of claim 12, wherein the loopback module comprises a poly-phase filter with at least two differential outputs, wherein further a first differential output is configured to generate the first phase-shifted signal and a second differential output is configured to generate the second phase-shifted signal.

14. The apparatus of claim 13, wherein the signal generator is a digital signal generator coupled to the inputs of one or more digital-to-analog converters of the transmitter.

15. The apparatus of claim 14, wherein the parameter module is a digital sampling module coupled to the outputs of one or more analog-to-digital converters of the receiver, wherein further the parameter module is configured to sample the first receiver signal of the two receiver signals a plurality of times to obtain the set of parameters.

16. The apparatus of claim 15, wherein:
the two receiver signals comprises two receiver signals; and
the parameter module is configured to obtain a portion of the set of parameters within a single period of the second receiver signal.

17. The apparatus of claim 16, wherein the calculation module is configured to calculate the correction parameters within a single period of the second receiver signal after the parameter module has obtained the portion of the set of parameters.

18. A system, comprising:
a transceiver coupled to an antenna, wherein the transceiver comprises a direct conversion transmitter and a direct conversion receiver;

a phase-shifting module to receive a transmitter signal from the radio frequency (RF) section of the transmitter and generate two phase-shifted signals based on the transmitter signal each including an I-channel and a Q-channel, wherein generation of the transmitter signal is via injection of a single-frequency signal into the transmitter, and to couple the two phase-shifted signals to the RF section of the direct conversion receiver, wherein generation of the two phase-shifted signals comprises generation of a first phase-shifted signal via adding a first phase shift to the transmitter signal and generation of a second phase-shifted signal via adding a second phase shift to the transmitter signal;

a measurement module coupled to the direct conversion receiver to measure the two receiver signals;

a calculation module, coupled to the direct conversion receiver, to calculate correction parameters for correction of quadrature imbalance in the transceiver based upon the measurements of the two receiver signals by the measurement module wherein the phase-shifting module is located in a portion of a loopback path between a radio frequency (RF) portion of the transmitter and an RF section of the receiver and wherein the calculation of the correction parameters to be based on the two phase-shifted signals.

19. The system of claim 18, wherein the transceiver comprises a media access control (MAC) module configured to communicate with an 802.11g wireless network.

20. The system of claim 18, wherein the antenna comprises a cell phone antenna.

* * * * *